Figure 1:
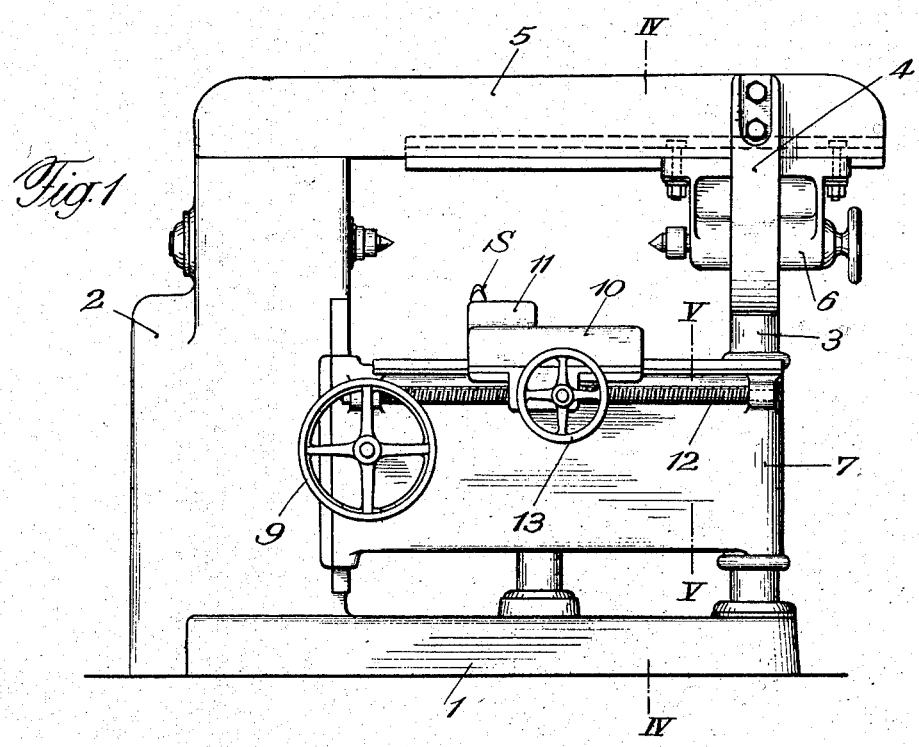

May 11, 1937.  F. E. O. HOPPE  2,080,207

LATHE

Filed July 13, 1936  2 Sheets-Sheet 1

Inventor:
Franz E. O. Hoppe.
By Sommers & Young
Attys

May 11, 1937.  F. E. O. HOPPE  2,080,207
LATHE
Filed July 13, 1936   2 Sheets-Sheet 2
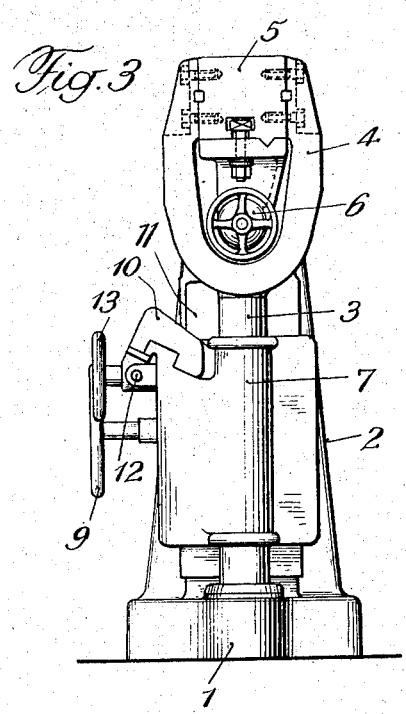
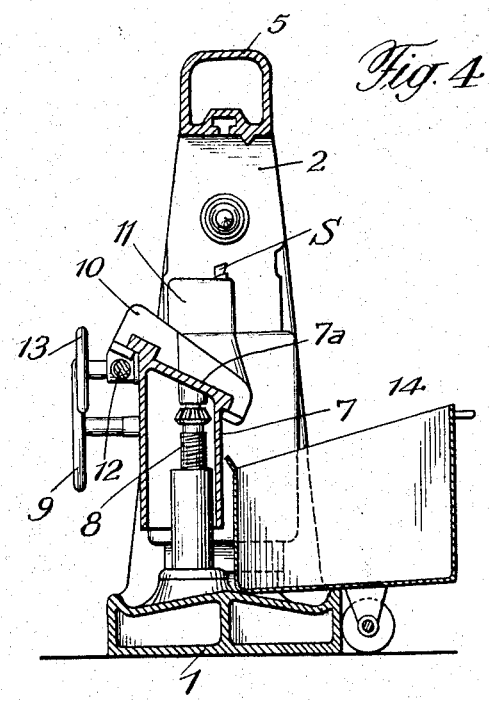
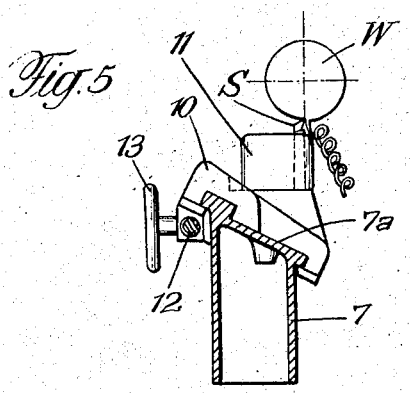
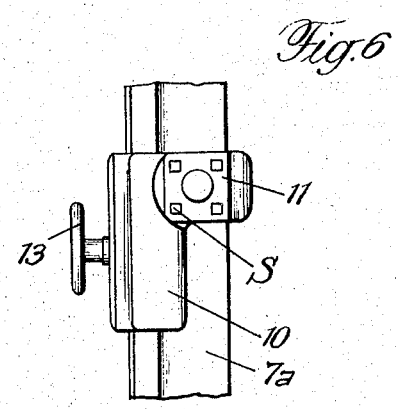
Inventor:
Franz E. O. Hoppe.
By Sommers & Young
Attys Patented May 11, 1937

2,080,207

UNITED STATES PATENT OFFICE 2,080,207

LATHE

Franz Emil Oskar Hoppe, Rorschacherberg, Switzerland

Application July 13, 1936, Serial No. 90,426
In Germany August 8, 1935

4 Claims. (Cl. 82—2)

The subject of the present invention is a lathe having a head stock lodged in a rigid frame and a tail stock suspended on an upper longitudinal beam of the rigid frame so as to be longitudinally displaceable. Lathes of this type have already been proposed and designated as "Universal-lathe" which should permit the performance of all possible kinds of work besides the ordinary turning. However, with these machines the head stock as well as the tail stock projected laterally in the manner of protruding arms, so that the work was mounted eccentrically and overhanging and the cross slide also overhung the bed to a great extent, the bed being already eccentric, so that vibrations of such magnitude occurred when turning that this machine, in which the lathe tool was fed horizontally in the usual manner, could not be used with ordinary lathe tools and particularly not with lathe tools of hard metal working with high cutting speeds and considerable thickness of cuttings.

Furthermore, lathes with and without rigid frames have been proposed for turning cylindrical objects in series such as shells in which the place where the tool cuts has been shifted out of the horizontal position or the tool has been fixed in an inclined position in a cross slide displaceable on an inclined bed or the tool was even arranged in a vertically downward position in order to obviate on the one hand the endangering of the operator by glowing, sharp edged and serrated cuttings projected in rough turning, and on the other side to subdue the vibrations when turning with hard-metal tools. However the desired effect was obtained in an incomplete manner or not at all, although undesirable additional parts such as protecting covers over the cross slides and covering plates for the guide facings on the lathe bed had been used, and last but not least the performance of normal turning work, that is, the turning of profiled work having large differences in diameters and length was impossible on these known lathes. It is however of utmost importance to prevent endangering the operator, who has continually to check over the dimensions, by the projected cuttings and to prevent the cuttings from falling on the guide facing of the cross slide and to obtain a complete rigidity and freedom of vibrations of the lathe itself even when turning rough by a suitable design of the main parts of the lathe and particularly by avoiding all overhanging structure and overhanging supports for head stock, tail stock and slides, so as to be able to turn any profiled work with a lathe tool that is fixed as short as possible and to avoid vibrations of the lathe tool itself which cause always ruptures of the cutting edge.

All these requirements are responded to by the lathe according to the invention in which the bed for the cross slide for the lathe tool is vertically displaceable and centrically guided in the rigid frame so that the radial feed of the lathe tool, the cutting face of which points towards the rear side of the lathe, is effected from below towards the lowest point of the work, head stock and tail stock being arranged in the longitudinal center plane of the rigid frame.

Owing to this arrangement in which any overhanging or dished out portion of the rigid frame, of the head stock, tail stock or cross-slide is avoided, the working is totally free from vibrations even when the lathe tool works at its full capacity and, as the tool cooperates with the work vertically from below and with its cutting face directed rearwardly the detachment of the cuttings is completely free downwardly and towards the rear of the lathe, so that the cuttings do not fall on the lathe bed, do not hinder the visual control of the cutting spot nor do they endanger the operator and do not require special protecting devices such as protecting covers, covering plates and the like.

Obviously instead of a single lathe tool a plurality of lathe tools may be used one fixed beside the other.

Figure 2:
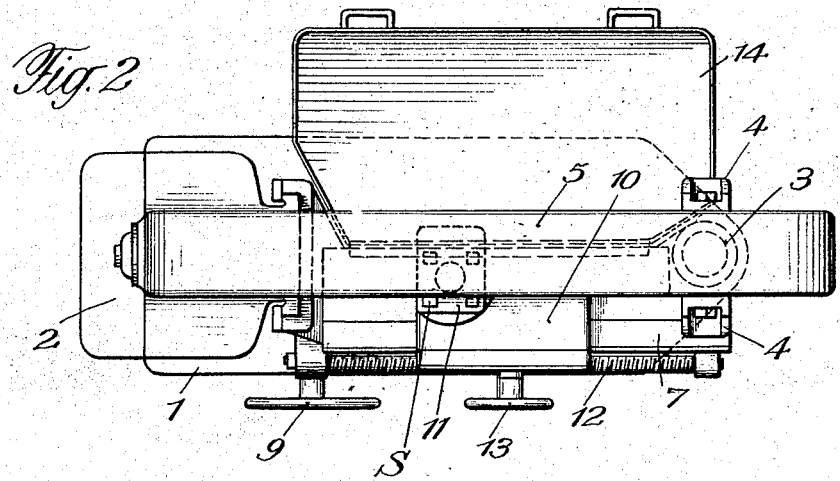

A constructional example of an embodiment of the invention is illustrated on the accompanying drawings, in which Fig. 1 shows the machine in elevation, Fig. 2 is a plan view of same, Fig. 3 is a front elevation seen from the tail stock end, Fig. 4 is a vertical section along line IV—IV in Fig. 1, Fig. 5 is a vertical section along line V—V in Fig. 1, and Fig. 6 shows in a plan view the tool holder and the cross slide.

The frame of the illustrated machine tool is a rigid box frame. It is composed of a base part 1 having on one end a standard 2 for the head stock and on the other end a standard 3 for the tail stock, a forked head 4 fixed to the tail stock standard 3 and a beam 5 connecting the forked head 4 with the head stock standard 2, the tail stock 6 being suspended and longitudinally displaceable along said beam. The bed 7 is guided to be displaced in height in guides of the head stock standard 2 at one end and in guides of the tail stock standard 3 at the other end. The bed 7 is mounted on a lifting screw 8 the drive of which (not illustrated in the drawings) is housed in the bed 7 and the height of the bed may be adjusted by means of the hand wheel 9 mechanically or hydraulically.

The means (not illustrated) for a hydraulic displacement in height may be arranged in the base part 1, if desired in combination with a copying device.

The bed 7 guided on the head stock standard 2 by means of a centric U-shaped guidance and is dished out towards the front so that its rear side is situated approximately in a vertical plane passing through longitudinal center plane or the axes of the centers respectively and is provided with an upper guide facing 7a declined towards the rear to facilitate the sliding off of the cuttings; the cross-slide 10 cooperates with said guide facing 7a and has its upper surface also declined towards the rear. The cross slide 10 carries the tool holder 11. For the purpose of displacing the cross slide a feed spindle 12 is mounted at the front side of the bed 7 and is actuated by means of a hand wheel 13. The provision of a feed spindle 12 mounted in the upper part and outside of the bed 7 avoids edging moments and the declined bed guide facing need not be interrupted by a gap which would be disadvantageous as regards the removal of the cuttings and of the cooling liquid.

The tool rest 11, in which the tool S is so held that its cutting edge as shown is directed towards the rear, is adjustable so that the tool may also be arranged on the cross slide with its cutting edge at right angles to that shown or in any intermediate position of adjustment. Fig. 5 shows the manner in which the cuttings are removed from the work W and fall directly towards the rear, for instance into a container 14 for the cuttings placed in a convenient position and indicated in chain-dotted lines in Figs. 2 and 4. By passing through the gap of the forked head 4, which is rigidly connected with the beam 5, the tail stock 6 may be displaced along the whole length of the beam up to the outer end of the latter, whereby a useful distance of centers is obtained in comparison to the length of the bed which exceeds that of the usual lathes.

Steady rests for supporting long thin work pieces may be used on the beam.

Instead of the tool rest a revolving cutter head may be provided for boring purposes and the tail stock may be constructed as boring tail stock.

Obviously the feed of the cross slide may be effected by mechanical or hydraulic means instead of by hand.

With lathes having a considerable length of bed a plurality of lifting spindles preferably actuated in common are provided instead of a single lifting spindle.

I claim:

1. A lathe comprising a rigid frame having an upper longitudinally extending beam, a head stock mounted in the frame, and a tail stock slidably suspended from said beam, said frame providing a lathe bed, a cross slide having a tool holder, said slide being mounted vertically adjustably on the frame and the tool holder being mounted centrally of the center plane of the frame, a tool mounted in said tool holder and having a cutting edge facing rearwardly, and located in the central longitudinal plane of the frame and at the lowest point of the work, the headstock and tailstock both being located centrally of the middle plane of the frame.

2. A lathe comprising in combination, a head stock, a tail stock, a bed, a rigid frame consisting of a base part, of a standard at the one end of the base part and containing the head stock, of a standard at its other end, of a forked head having an opening and fixed to the last mentioned standard, of a beam fixed to said head stock standard and to said forked head and projecting beyond the second standard, the tail stock being suspended from said beam and displaceable along the whole length of the latter by passing thereby through the opening of said forked head, guidances in said standards for vertical displacement of said bed, and a cross-slide on said lathe bed, and a tool fixed on said cross-slide with its cutting face pointing towards the rear of the lathe, the radial feed of the tool occurring at the lowest point of the work.

3. A lathe comprising in combination, a head stock, a tail stock, a bed having a guide facing inclined towards the rear of the lathe and having its center part dished out towards the front of the lathe so that its rear side is situated in a plane passing through the axis of the centers, a rigid frame consisting of a base part, of a standard at the one end of the base part and containing the head stock, of a standard at its other end, of a forked head having an opening and fixed to the last mentioned standard, of a beam fixed to said head stock standard and to said forked head and projecting beyond the second standard, the tail stock being suspended from said beam and displaceable along the whole length of the latter by passing thereby through the opening of said forked head, guidances in said standards for vertical displacement of said bed, a cross-slide on said lathe bed, and a tool fixed on said cross-slide with its cutting face pointing towards the rear of the lathe, the radial feed of the tool occurring at the lowest point of the work.

4. A lathe comprising in combination, a head stock, a tail stock, a bed having a guide facing inclined towards the rear of the lathe and having its center part dished out towards the front of the lathe so that its rear side is situated in a plane passing through the axis of the centers, a rigid frame consisting of a base part, of a standard at the one end of the base part, and containing the head stock, of a standard at its other end, of a forked head having an opening and fixed to the last mentioned standard, of a beam fixed to said head stock standard and to said forked head and projecting beyond the second standard, the tail stock being suspended from said beam and displaceable along the whole length of the latter by passing thereby through the opening of said forked head, guidances in said standards for vertical displacement of said bed, at least one lifting spindle mounted in said base part for lifting the bed and feeding a tool, a cross-slide on said lathe bed, and a tool fixed on said cross-slide with its cutting face pointing towards the rear of the lathe, the radial feed of the tool occurring at the lowest point of the work and the cuttings falling down freely off the rear side of the bed.

FRANZ EMIL OSKAR HOPPE.